United States Patent
Nomura

(10) Patent No.: US 7,474,837 B2
(45) Date of Patent: Jan. 6, 2009

(54) RECORDING AND PLAYBACK APPARATUS AND METHOD, PROGRAM STORAGE MEDIUM, AND PROGRAM

(75) Inventor: Yasuo Nomura, Kanagawa (JP)

(73) Assignee: Sony Corporation, Tokyo (JP)

( * ) Notice: Subject to any disclaimer, the term of this patent is extended or adjusted under 35 U.S.C. 154(b) by 1384 days.

(21) Appl. No.: 10/054,212

(22) Filed: Jan. 22, 2002

(65) Prior Publication Data
US 2002/0110370 A1 Aug. 15, 2002

(30) Foreign Application Priority Data
Jan. 24, 2001 (JP) .............................. 2001-015375

(51) Int. Cl.
H04N 5/91 (2006.01)
H04N 7/00 (2006.01)

(52) U.S. Cl. ..................... 386/104; 386/111; 386/131

(58) Field of Classification Search ................ 386/131, 386/111, 129, 115, 125, 124
See application file for complete search history.

(56) References Cited

U.S. PATENT DOCUMENTS

| 5,485,280 | A | * | 1/1996 | Fujinami et al. | 386/123 |
| 5,852,435 | A | | 12/1998 | Vigneaux et al. | |
| 6,078,727 | A | * | 6/2000 | Saeki et al. | 386/125 |
| 6,226,447 | B1 | * | 5/2001 | Sasaki et al. | 386/112 |
| 6,233,389 | B1 | * | 5/2001 | Barton et al. | 386/46 |
| 6,385,386 | B1 | | 5/2002 | Aotake | |
| 6,798,980 | B1 | * | 9/2004 | Seo | 386/125 |
| 6,983,019 | B2 | | 1/2006 | Yiwen et al. | 375/240.16 |

FOREIGN PATENT DOCUMENTS

| EP | 0 661 885 | 7/1995 |
| EP | 0 762 756 | 3/1997 |
| EP | 0 951 184 | 10/1999 |
| EP | 1 047 259 | 10/2000 |
| JP | 8-98181 | 4/1996 |
| JP | 9-326168 | 12/1997 |
| JP | 11 039850 | 2/1999 |
| JP | 11-39850 | 2/1999 |
| JP | 2000-78557 | 3/2000 |
| JP | 2001-128170 | 5/2001 |
| JP | 2001-238218 | 8/2001 |

OTHER PUBLICATIONS

Keesman G et al: "Transcoding of MPEG Bitstreams" Signal Processing. Image Communication, Elsevier Science Publishers, Amsterdam, NL, vol. 8, No. 6, Sep. 1, 1996, pp. 481-500, XP 000596654 ISSN: 0923-5965.

* cited by examiner

*Primary Examiner*—Thai Tran
*Assistant Examiner*—Girumsew Wendmagegn
(74) *Attorney, Agent, or Firm*—Oblon, Spivak, McClelland, Maier & Neustadt, P.C.

(57) ABSTRACT

A recording and playback apparatus and method, a program storage medium and a program by which AV signals of a program being recorded can be converted into AV signals of another format are disclosed. First, it is discriminated whether or not a recording process is started. If it is discriminated that a recording process is started, then coded data being currently recorded are read out and converted into coded data of another format. Thereafter, the coded data obtained by the format conversion are recorded onto a hard disk.

9 Claims, 4 Drawing Sheets

US 7,474,837 B2

RECORDING AND PLAYBACK APPARATUS AND METHOD, PROGRAM STORAGE MEDIUM, AND PROGRAM

BACKGROUND OF THE INVENTION

This invention relates to a recording and playback apparatus and method, a program storage medium and a program, and more particularly to a recording and playback apparatus and method, a program storage medium and a program suitable for use to record and play back video and audio signals of a received television broadcasting signal onto and from a randomly accessibly recording medium.

An apparatus is conventionally available which can receive a television broadcasting signal, encode video and audio signals (hereinafter referred to as AV signals) of the television broadcasting signal using the MPEG (Moving Picture Experts Group) 2 system or the like and record the encoded AV signals onto a randomly accessible recording medium such as a hard disk and can play back the AV signals from the recording medium. An apparatus of the type described is hereinafter referred to as hard disk video recorder.

Also a personal computer is available which has functions similar to those of a hard disk video recorder.

Since conventional hard disk video recorders and personal computers having similar functions use a randomly accessible recording medium, it is possible for them to effect slip playback, that is, to record AV signals of a certain program and simultaneously play back the AV signals of the program being recorded or AV signals of another program recorded already on the recording medium. It is to be noted that such a slip playback technique as just described has been proposed by the Assignee of the present application and is disclosed, for example, in Japanese Patent Laid-Open No. Hei 11-39850.

Also it is possible for conventional hard disk video recorders and personal computers having similar functions to copy AV signals encoded so as to have a predetermined format such as the format of the MPEG2 system and recorded on a recording medium, convert the format of such AV signals into another format such as, for example, the format of the MPEG1 system or transfer such AV signals to another apparatus. However, they have a subject to be solved in that they cannot copy AV signals of a program being recorded, convert the format of the AV signals into another format or transfer the AV signals to another apparatus.

SUMMARY OF THE INVENTION

It is an object of the present invention to provide a recording and playback apparatus and method, a program storage medium and a program by which AV signals of a program being recorded can be copied, converted into AV signals of another format and transferred to another apparatus.

In order to attain the object described above, according to an aspect of the present invention, there is provided a recording and playback apparatus for encoding inputted AV signals to produce coded data and recording the coded data onto a randomly accessible recording medium and for playing back and decoding the coded data recorded on the recording medium, comprising production means for encoding the inputted AV signals using a first coding system to produce first coded data, first recording means for recording the first coded data produced by the production means onto the recording medium, supervision means for supervising the recording process by the first recording means, readout means for reading out the first coded data recorded on the recording medium by the first recording means from the recording medium, conversion means for converting the first coded data read out from the recording means by the readout means into second coded data corresponding to a second coding system, and second recording means for recording the second coded data converted by the conversion means onto the recording medium, the readout means, conversion means and second recording means being operable to execute the respective processes simultaneously with the recording process by the first recording means based on a result of the supervision by the supervision means.

According to another aspect of the present invention, there is provided a recording and playback method for a recording and playback apparatus which encodes inputted AV signals to produce coded data and records the coded data onto a randomly accessible recording medium and further plays back and decodes the coded data recorded on the recording medium, comprising a production step of encoding the inputted AV signals using a first coding system to produce first coded data, a first recording step of recording the first coded data produced by the process of the production step onto the recording medium, a supervision step of supervising the process of the first recording step, a readout step of reading out the first coded data recorded on the recording medium by the process of the first recording step from the recording medium, a conversion step of converting the first coded data read out from the recording means by the process of the readout step into second coded data corresponding to a second coding system, and a second recording step of recording the second coded data converted by the process of the conversion step onto the recording medium, the processes of the readout step, conversion step and second recording step being executed simultaneously with the process of the first recording step based on a result of the supervision by the process of the supervision step.

According to a further aspect of the present invention, there is provided a program storage medium in which a computer-readable program for encoding inputted AV signals to produce coded data and recording the coded data onto a randomly accessible recording medium and for playing back and decoding the coded data recorded on the recording medium, the program comprising a production step of encoding the inputted AV signals using a first coding system to produce first coded data, a first recording step of recording the first coded data produced by the process of the production step onto the recording medium, a supervision step of supervising the process of the first recording step, a readout step of reading out the first coded data recorded on the recording medium by the process of the first recording step from the recording medium, a conversion step of converting the first coded data read out from the recording means by the process of the readout step into second coded data corresponding to a second coding system, and a second recording step of recording the second coded data converted by the process of the conversion step onto the recording medium, the processes of the readout step, conversion step and second recording step being executed simultaneously with the process of the first recording step based on a result of the supervision by the process of the supervision step.

According to a still further aspect of the present invention, there is provided a program for causing a computer, which encodes inputted AV signals to produce coded data and records the coded data onto a randomly accessible recording medium and further plays back and decodes the coded data recorded on the recording medium, to execute a production step of encoding the inputted AV signals using a first coding system to produce first coded data, a first recording step of recording the first coded data produced by the process of the production step onto the recording medium, a supervision step of supervising the process of the first recording step, a readout step of reading out the first coded data recorded on the recording medium by the process of the first recording step from the recording medium, a conversion step of converting the first coded data read out from the recording means by the process of the readout step into second coded data corresponding to a second coding system, and a second recording step of recording the second coded data converted by the process of the conversion step onto the recording medium, the processes of the readout step, conversion step and second recording step being executed simultaneously with the process of the first recording step based on a result of the supervision by the process of the supervision step.

With the recording and playback apparatus and method, program storage medium and program, inputted AV data are encoded using a first coding system to produce first coded data, and the thus produced first coded data are recorded onto a recording medium. Meanwhile, the recording process is supervised. Further, the first coded data recorded on the recording medium by the recording process are read out from the recording medium, and the first coded data read out from the recording medium are converted into second coded data corresponding to a second coding system. Then, the second coded data obtained by the conversion are recorded onto the recording medium. The readout process, conversion process and second recording process are executed simultaneously with the first recording process based on a result of the supervision by the supervision process. Consequently, AV signals of a program being recorded can be converted into AV signals of another format.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

Figure 1:
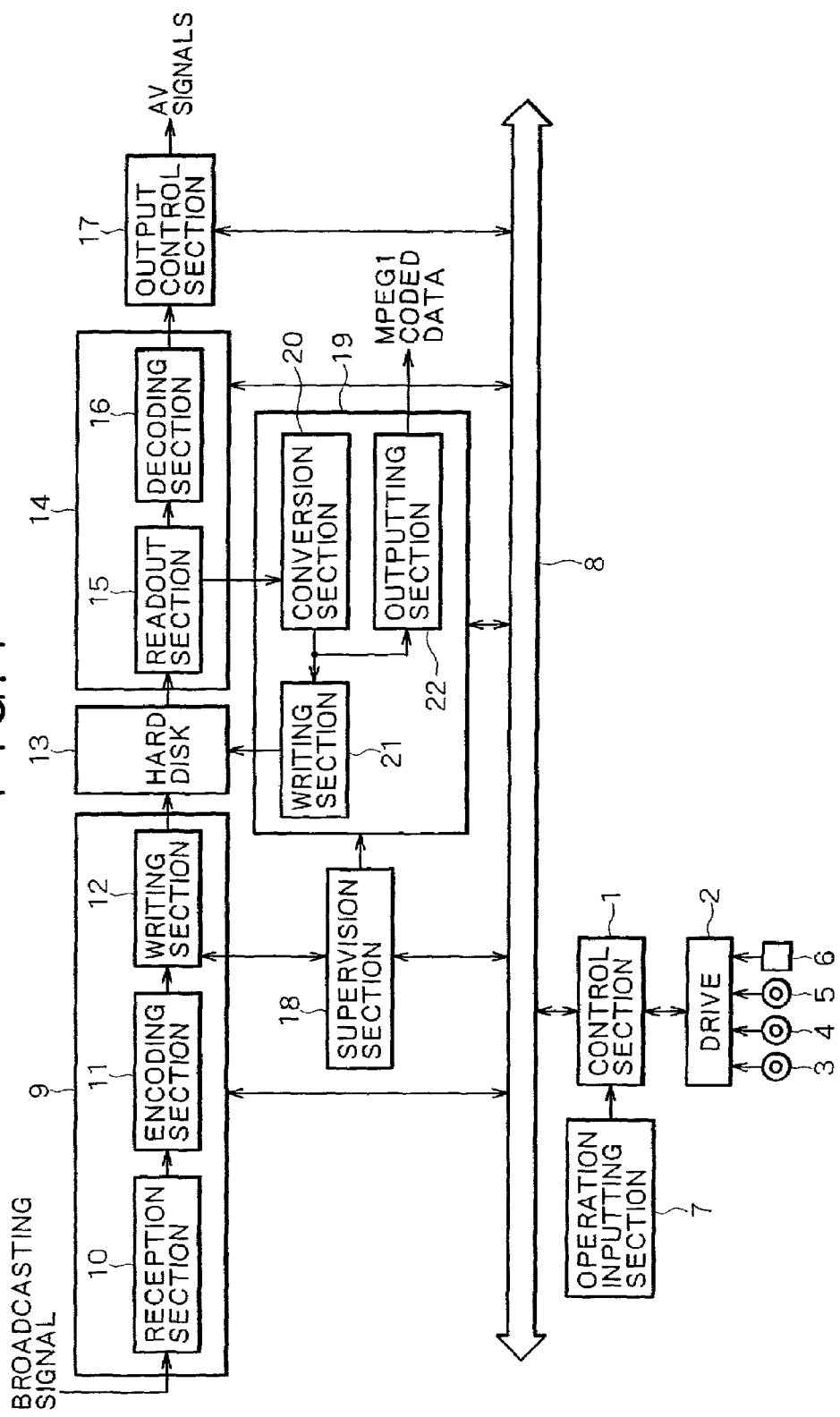
FIG. 1 is a block diagram showing an example of a configuration of a video recorder to which the present invention is applied.

Referring first to FIG. 1, there is shown an example of a configuration of a video recorder to which the present invention is applied. The video recorder can receive a television broadcasting signal, record AV signals of a program of the television broadcasting signal onto a hard disk and play back the AV signals from the hard disk.

The video recorder includes, as main components thereof, a control section 1 for controlling the entire video recorder, a recording section 9 for receiving a television broadcasting signal, encoding AV signals of a program of the television broadcasting signal and recording the encoded AV signals onto a hard disk 13, an operation inputting section 7 for accepting a command from user, a playback section 14 for reading out and decoding encoded AV signals recorded on the hard disk 13, an output control section 17 for outputting the AV signals supplied thereto from the playback section 14 to a monitor (not shown) or the like in the following stage, a supervision section 18 for supervising operation of the recording section 9, and a conversion section 19 for reading out encoded AV signals being recorded and converting the AV signals into AV signals of another format.

The control section 1 includes a central processing unit (CPU, not shown) and so forth, and controls a drive 2 to read out a controlling program stored on a magnetic disk 3, an optical disk 4, a magneto-optical disk 5 or a semiconductor memory 6 and controls the components of the video recorder through a bus 8 based on the thus read out controlling program, a command inputted by the user and so forth.

The operation inputting section 7 includes a remote controller and so forth, and accepts various commands from the user and notifies the control section 1 of the information of the commands.

The recording section 9 includes a reception section 10 for acquiring AV signals of a program selected by the user from within a television broadcasting signal received by an antenna and so forth, an encoding section 11 for encoding the AV signals acquired by and inputted from the reception section 10 using a predetermined system such as, for example, the MPEG2 system to produce coded data, and a writing section 12 for recording the coded data inputted thereto from the encoding section 11, that is, the AV signals encoded using the MPEG2 system or the like, onto the hard disk 13.

The playback section 14 includes a readout section 15 for reading out coded data or encoded AV signals recorded on the hard disk 13, and a decoding section 16 for decoding the coded data read out by and inputted from the readout section 15 and supplying resulting AV signals to the output control section 17. The readout section 15 suitably outputs coded data read out from the hard disk 13 also to the conversion section 19.

The supervision section 18 supervises operation of the recording section 9 and notifies the conversion section 19 of supervision result information representative of whether or not recording is proceeding with the recording section 9.

The conversion section 19 includes a conversion section 20 for converting the format of coded data supplied thereto from the readout section 15 of the playback section 14 into that of, for example, the MPEG1 system, a writing section 21 for recording the coded data inputted thereto from the conversion section 20, that is, AV signals of the MPEG 1 format converted by the conversion section 20, onto the hard disk 13, and an outputting section 22 for outputting the coded data inputted thereto from the conversion section 20, that is, the AV signals of the MPEG1 format converted by the conversion section 20, to another electronic apparatus not shown through a predetermined network such as, for example, an IEEE (Institute of Electrical and Electronics Engineers) 1394 data bus network.

The conversion section 20 can output coded data supplied thereto from the readout section 15 of the playback section 14 as they are without converting the format of them to the writing section 21 and the outputting section 22.

Figure 2:
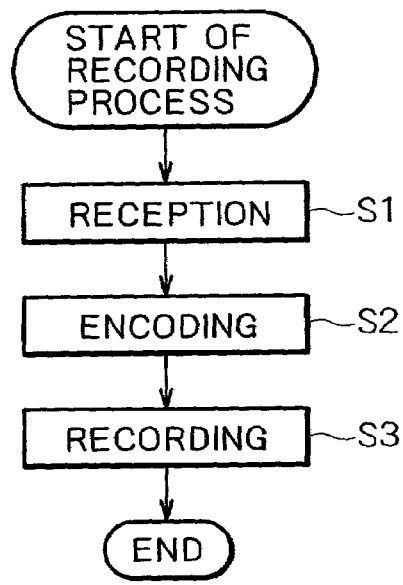
FIG. 2 is a flow chart illustrating a recording process of the video recorder of FIG. 1.

Now, operation of the video recorder is described. First, a recording process for recording AV signals of a program of a television broadcast onto the hard disk 13 is described with reference to a flow chart of FIG. 2. The recording process is started when an instruction to start recording is issued by the user or when the time reserved for recording in advance comes.

First in step S1, the reception section 10 acquires AV signals of a program selected by the user from within a television broadcasting signal inputted from the antenna or the like and outputs the acquired AV signals to the encoding section 11. In step S2, the encoding section 11 encodes the AV signals inputted thereto from the reception section 10 using a predetermined system such as the MPEG2 system and outputs resulting coded data to the writing section 12. In step S3, the writing section 12 records the coded data inputted thereto from the writing section 12 onto the hard disk 13.

As described above, audio and video signals of the program of the television broadcast are recorded onto the hard disk 13 by the recording process by the reception section 10, encoding section 11 and writing section 12 which form the recording section 9.

Figure 3:
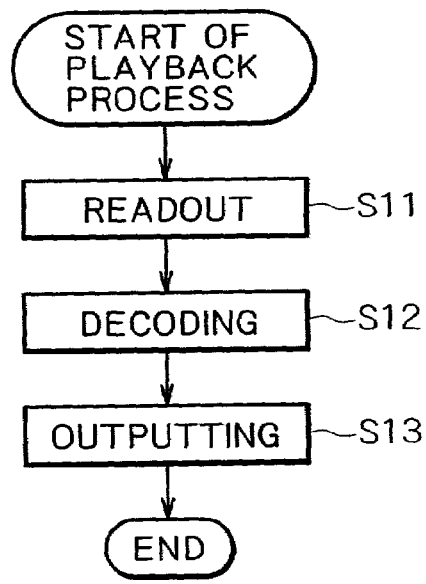
FIG. 3 is a flow chart illustrating a playback process of the video recorder of FIG. 1.

Now, a playback process for playing back audio and video signals of a television broadcast recorded on the hard disk 13 is described with reference to a flow chart of FIG. 3. The playback process is started when an instruction to start playback is issued by the user.

First in step S11, the readout section 15 reads out coded data designated by the user from among coded data or encoded AV signals recorded on the hard disk 13 and outputs the coded data to the decoding section 16. In step S12, the decoding section 16 decodes the coded data inputted thereto from the readout section 15 and supplies resulting AV signals to the output control section 17. In step S13, the output control section 17 supplies the AV signals supplied thereto from the playback section 14 to the monitor in the following stage.

The monitor to which the AV signals are supplied outputs sound corresponding to the audio signal from within the AV signals from a speaker not shown and displays a video corresponding to the video signal from within the AV signals.

As described above, the audio and video signals of a program of a television broadcast recorded on the hard disk 13 are played back by the playback process by the readout section 15, decoding section 16 and output control section 17 which compose the playback section 14.

Now, a conversion process for reading out coded data or encoded AV signals recorded on the hard disk 13, converting the read out coded data into coded data of another format and recording the resulting coded data onto the hard disk 13 is described with reference to FIGS. 4 to 6.

The conversion process may be executed either in response to designation of recorded coded data or automatically for coded data being currently recorded. In particular, the conversion process is executed when the user drags an icon corresponding to one of recorded coded data displayed in a window for coded data management displayed on the monitor and drops the icon into a conversion setting window 31 (FIG. 4). Further, the conversion process is automatically executed simultaneously with the recording process described hereinabove if an automatic conversion check box 36 (FIG. 4) of the conversion setting window 31 is on.

Figure 4:
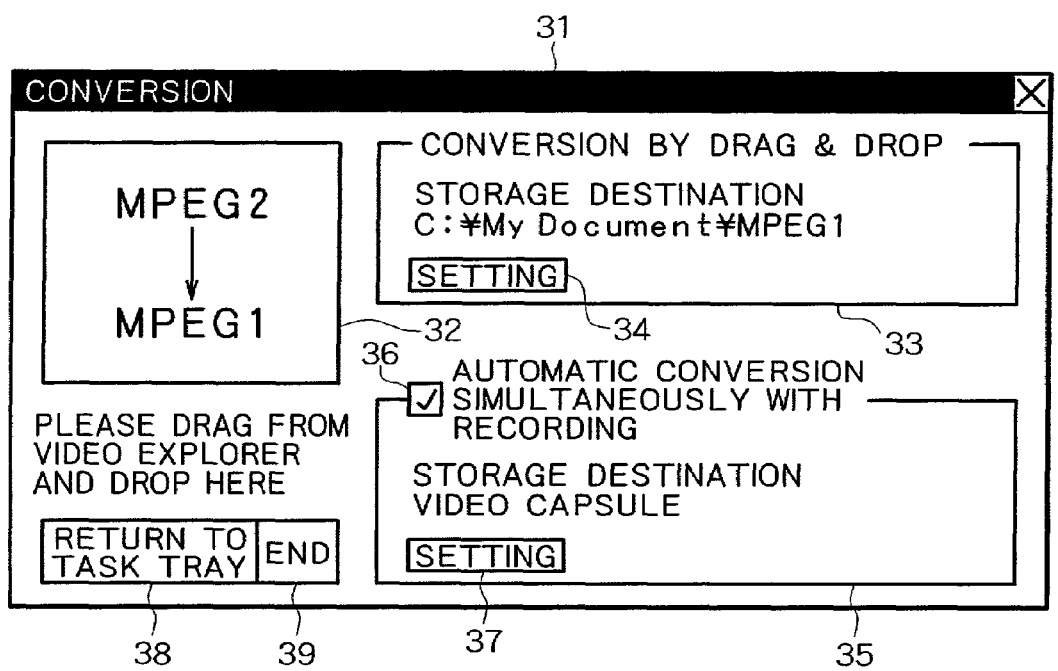
FIG. 4 is a schematic view showing an example of a display of a conversion setting window used by the video recorder of FIG. 1.

FIG. 4 shows an example of a display of the conversion setting window 31 used to perform various settings regarding a conversion process displayed on the monitor in response to a predetermined operation. In a bit map region 32 of the conversion setting window 31, a format of coded data before a conversion process is performed (in FIG. 4, the MPEG2 system) and another format of the coded data after the conversion process (in FIG. 4, the MPEG1 system) are presented.

It is to be noted that a video or a thumbnail image of coded data for which the conversion process is to be performed may be displayed in the bit map region 32.

In a storage destination display region 33, a directory of the hard disk 13 onto which coded data after conversion are to be stored when a conversion process is executed by drag and drop operation is indicated. In the display example of FIG. 4, "C: ¥My Document¥MPEG1" is set as the storage destination.

A "setting" button 34 is depressed in order to display a storage destination setting window 41 (FIG. 5) for changing the storage destination of converted coded data displayed in the storage destination display region 33.

In a storage destination display region 35, a storage destination (a directory of the hard disk 13 or the like) into which converted coded data are to be stored when the conversion process is executed automatically simultaneously with the recording process is indicated. In the display example of FIG. 4, a video capsule is set as the storage destination.

The automatic conversion check box 36 is provided to set so that the conversion process may be executed automatically simultaneously with the recording process described above, and is on in default. However, the conversion process is not executed if the free capacity of the hard disk 13 is smaller than a predetermined amount.

A "setting" button 37 is depressed in order to display the storage destination setting window 41 for changing the storage destination of converted coded data indicated in the storage destination display region 35.

A "return to task tray" button 38 is used to convert and display the conversion setting window 31 into and as an icon. An "end" button 39 is used to close the conversion setting window 31.

It is to be noted that the size of the display of the conversion setting window 31 can be increased or decreased.

Figure 5:
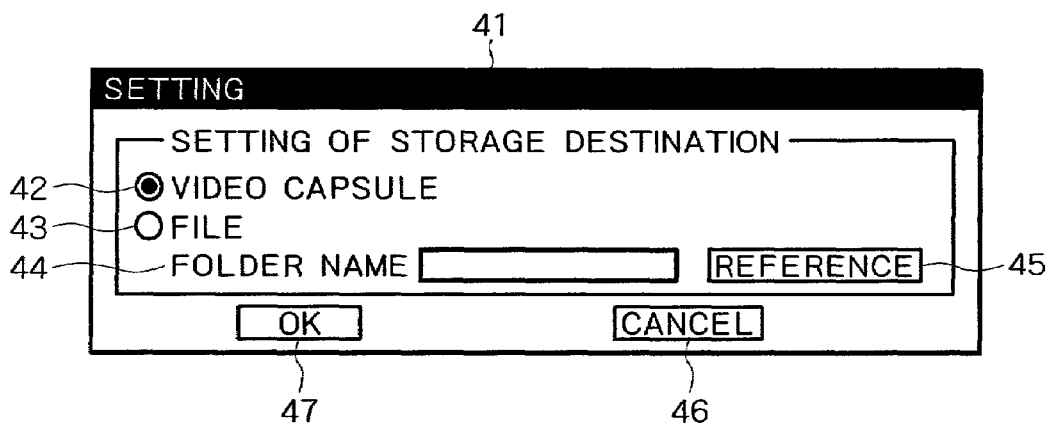
FIG. 5 is a schematic view showing an example of a display of a storage destination setting window used by the video recorder of FIG. 1.
Figure 6:
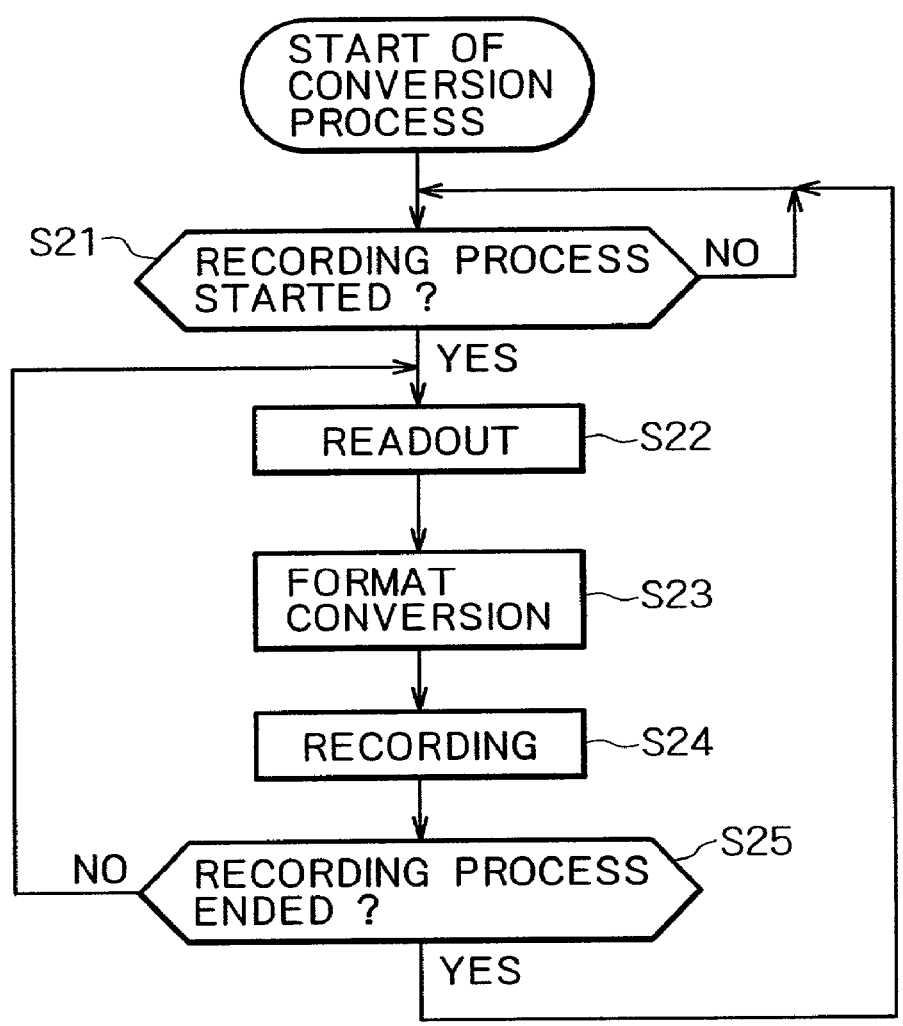
FIG. 6 is a flow chart illustrating a conversion process of the video recorder of FIG. 1.

FIG. 5 shows an example of a display of the storage destination setting window 41 for changing the storage destination of converted coded data. A check box 42 is turned on in order to store converted coded data as a video capsule. A check box 43 is turned on in order to store converted coded data as a file. It is to be noted that, when converted coded data are stored as a file, not only coded data of the MPEG1 format but also attribute data to which an extension ssx, scx or sdb is added are stored.

In a folder name display region 44, a folder name set to the storage destination into which converted coded data are to be stored as a file is indicated. A "reference" button 45 is depressed in order to display a setting dialog for setting a storage destination into which converted coded data are to be stored as a file.

An "OK" button 47 is depressed in order to settle any setting for the storage destination setting window 41. A "cancel" button 46 is depressed in order to cancel some setting for the storage destination setting window 41 and close the storage destination setting window 41.

Now, the conversion process which is executed automatically simultaneously with the recording process described hereinabove while the automatic conversion check box 36 of the conversion setting window 31 is on is described with reference to a flow chart of FIG. 6. On the premise that the conversion process is started, the supervision section 18 supervises operation of the recording section 9 and it is known to the conversion section 19 whether or not the recording section 9 is in a recording operation from a notification issued from the supervision section 18 to the conversion section 19.

First in step S21, the conversion section 19 discriminates whether or not the recording process has been started by the recording section 9 based on supervision result information conveyed thereto from the supervision section 18, and waits until it discriminates that the recording process has been started. When the conversion section 19 discriminates that the recording process has been started, the processing advances to step S22.

In step S22, the readout section 15 reads out coded data being currently recorded onto the hard disk 13 by the recording section 9 and outputs the coded data to the conversion section 20 of the conversion section 19. In step S23, the conversion section 20 converts the format of the coded data supplied thereto from the readout section 15, that is, AV signals encoded in accordance with the MPEG2 system, to obtain different coded data, that is, AV signals encoded in accordance with the MPEG1 system, and outputs the resulting coded data to the writing section 21. In step S24, the writing section 21 records the coded data inputted thereto from the conversion section 20, that is, the AV signals encoded in accordance with the MPEG1 system, onto the hard disk 13.

In step S25, the conversion section 19 discriminates based on the supervision result information conveyed thereto from the supervision section 18 whether or not the recording process executed by the recording section 9 comes to an end. If it is discriminated that the recording process does not come to an end, then the processing returns to step S22 so that similar processing to that described above is repeated. If it is discriminated that the recording process comes to an end, then the processing returns to step S21.

As described above, according to the conversion process which is executed automatically, since AV signals encoded in accordance with the MPEG2 system are recorded onto the hard disk 13 and also AV signals encoded in accordance with the MPEG1 system are recorded onto the hard disk 13 simultaneously by the recording process, when the recording process comes to an end, both of the AV signals encoded in accordance with the MPEG2 system and the AV signals encoded in accordance with the MPEG1 system can be obtained simultaneously.

It is to be noted that also it is possible for the conversion section 20 to output, in response to a predetermined command from the user, coded data supplied from the readout section 15 of the playback section 14 as they are without converting the format thereof to the writing section 21. In this instance, when the recording process comes to an end, the AV signals encoded with the MPEG2 system and backup signals of them can be obtained simultaneously.

Further, if the output of the conversion section 20 is supplied to the outputting section 22 in the conversion process, then coded data of AV signals encoded in accordance with the MPEG1 system or the MPEG2 system can be transferred to another electronic apparatus through a predetermined network simultaneously with the recording process.

While the encoding section 11 in the present embodiment performs encoding in accordance with the MPEG2 system and the conversion section 20 performs decoding in accordance with the MPEG1 system, the encoding section 11 may otherwise perform encoding using an arbitrary format while the conversion section 20 performs conversion into an arbitrary format, for example, such that the encoding section 11 performs encoding using the AVI format which is common to Windows (trademark) platforms while the conversion section 20 performs conversion into the QuickTime format which is common to Macintosh (trademark) platforms.

While the series of processes described above can be executed by hardware such as the video recorder to which the present invention is applied, it may otherwise be implemented by predetermined software executed by a personal computer which includes a circuit board for receiving a television broadcast or the like. When the series of processes is executed by software, a program which constructs the software is installed from a program storage medium into a computer incorporated in hardware for exclusive use or, for example, a personal computer for universal use which can execute various functions by installing various programs.

The program storage medium for storing a program to be installed into a computer and placed into a state wherein it can be executed by the computer is formed as a package medium such as, as shown in FIG. 1, a magnetic disk 3 (including a floppy disk), an optical disk 4 (including a CD-ROM (Compact Disc-Read Only Memory) and a DVD (Digital Versatile Disk)), or a magneto-optical disk 5 (including an MD (Mini-Disk)), or a semiconductor memory 6 which has the program recorded thereon or therein and is distributed in order to provide the program separately from a computer. Else, the recording medium is formed as a ROM or a hard disk in which the program is stored therein temporarily or permanently. Storage of a program onto or into a program storage medium is performed through an interface such as a router or a modem utilizing a wired or wireless communication medium such as a local area network, the Internet or a digital satellite broadcast.

It is to be noted that, in the present specification, the steps which describe the program stored in a program storage medium may be but need not necessarily be processed in a time series in the order as described, and include processes which are executed in parallel or individually without being processed in a time series.

While a preferred embodiment of the present invention has been described using specific terms, such description is for illustrative purposes only, and it is to be understood that changes and variations may be made without departing from the spirit or scope of the following claims.

What is claimed is:

1. A recording and playback apparatus for encoding inputted AV signals to produce coded data and recording the coded data into a randomly accessible recording medium and for playing back and decoding the coded data recorded on the recording medium, comprising:

production means for encoding the inputted AV signals using a first coding system to produce first coded data;

first recording means for recording the first coded data produced by said production means onto the recording medium;

supervision means for supervising a start of a recording process by said first recording means;

readout means for reading out the first coded data recorded on the recording medium by said first recording means from the recording medium;

conversion means for converting the first coded data read out from the recording medium by said readout means into second coded data corresponding to a second coding system; and second recording means for recording the second coded data converted by said conversion means onto the recording medium;

said readout means, conversion means and second recording means being operable to execute the respective processes simultaneously with the recording process by said first recording means, when the start of the recording process by said first recording means is supervised, based on a result of the supervision by said supervision means.

2. A recording and playback apparatus according to claim 1, wherein the first coding system is the MPEG2 system and the second coding system is the MPEG 1 system.

3. A recording and playback apparatus according to claim 1, wherein said conversion selects one of a process of converting the first coded data read out from the recording medium by said readout means and another process of outputting the first coded data read out from the recording medium by said readout means as they are without converting the first coded data, and said second recording means records the first or second coded data produced by the process selected by said conversion means onto the recording medium.

4. A recording and playback apparatus according to claim 3, further comprising transfer means for transferring the first or second coded data produced by said conversion means to another electronic equipment.

5. A recording and playback method for a recording and playback apparatus which encodes inputted AV signals to produce coded data and records the coded data into a randomly accessible recording medium and further plays back and decodes the coded data recorded on the recording medium, comprising:
    a production step of encoding the inputted AV signals using a first coding system to produce first coded data;
    a first recording step of recording the first coded data produced by the process of the production step onto the recording medium;
    a supervision step of supervising a start of a recording process of the first recording step;
    a readout step of reading out the first coded data recorded on the recording medium by the process of the first recording step from the recording medium;
    a conversion step of converting the first coded data read out from the recording medium by the process of the readout step into second coded data corresponding to a second coding system; and
    a second recording step of recording the second coded data converted by the process of the conversion step onto the recording medium;
    the processes of the readout step, the conversion step and the second recording step, respectively, being executed simultaneously with the process of the first recording step, when the start of the recording process by said first recording step is supervised, based on a result of the supervision by the process of the supervision step.

6. A program storage medium in which a computer-readable program for encoding inputted AV signals to produce coded data and recording the coded data into a randomly accessible recording medium and for playing back and decoding the coded data recorded on the recording medium, the program comprising:
    a production step of encoding the inputted AV signals using a first coding system to produce first coded data;
    a first recording step of recording the first coded data produced by the process of the production step onto the recording medium;
    a supervision step of supervising a start of a recording process of the first recording step;
    a readout step of reading out the first coded data recorded on the recording medium by the process of the first recording step from the recording medium;
    a conversion step of converting the first coded data read out from the recording medium by the process of the readout step into second coded data corresponding to a second coding system; and
    a second recording step of recording the second coded data converted by the process of the conversion step onto the recording medium;
    the processes of the readout step, the conversion step and the second recording step, respectively, being executed simultaneously with the process of the first recording step, when the start of the recording process by said first recording step is supervised, based on a result of the supervision by the process of the supervision step.

7. A recording and playback apparatus for encoding inputted AV signals to produce coded data and recording the coded data into a storage and for playing back and decoding the coded data recorded on the storage, comprising:
    a recorder configured to record said inputted AV signal into said storage;
    an encoder configured to encode said inputted AV signal as the first coded data;
    a converter configured to convert said first coded data into said second coded data;
    setting means for setting about whether said converter automatically converts said first coded data into said second coded data with a recording process by said recorder; and
    said converter converts said first coded data into, second coded data in case said setting means is set as to automatically convert said first coded data with said recording process and in case said recorder records said inputted AV signal into said storage.

8. The apparatus of claim 7, wherein said recorder recodes said first coded data into said storage.

9. A recording and playback method for a recording and playback apparatus which encodes inputted AV signals to produce coded data and records the coded data into a storage and further plays back and decodes the coded data recorded on the storage, comprising:
    recording said inputted AV signal into said storage;
    encoding said inputted AV signal as the first coded data;
    converting said first coded data into said second coded data; and
    setting about whether said converting process automatically converts said first coded data into said second coded data with a recording process by a recorder,
    wherein converting said first coded data into second coded data is driven in case the setting is set as to automatically convert said first coded data with said recording process and in case said inputted AV signal is recorded into said storage.

* * * * *